(12) United States Patent
Oi

(10) Patent No.: US 12,384,424 B2
(45) Date of Patent: Aug. 12, 2025

(54) DEVICE, METHOD, AND COMPUTER PROGRAM FOR LANE DETERMINATION

(71) Applicant: TOYOTA JIDOSHA KABUSHIKI KAISHA, Toyota (JP)

(72) Inventor: Yuhei Oi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/319,754

(22) Filed: May 18, 2023

(65) Prior Publication Data

US 2024/0017748 A1    Jan. 18, 2024

(30) Foreign Application Priority Data

Jul. 15, 2022   (JP) ................. 2022-114211

(51) Int. Cl.
   *B60W 60/00*   (2020.01)
(52) U.S. Cl.
   CPC . *B60W 60/00274* (2020.02); *B60W 2420/403* (2013.01); *B60W 2554/4041* (2020.02)
(58) Field of Classification Search
   None
   See application file for complete search history.

(56) References Cited

U.S. PATENT DOCUMENTS

| | | | |
|---|---|---|---|
| 2019/0035280 A1 | 1/2019 | Kim et al. | |
| 2019/0193739 A1* | 6/2019 | Tokimasa | ............ G06V 20/588 |
| 2019/0232956 A1 | 8/2019 | Takaki | |
| 2021/0042955 A1* | 2/2021 | Lee | ...................... G06V 20/588 |
| 2021/0312199 A1 | 10/2021 | Hashimoto et al. | |
| 2023/0112878 A1* | 4/2023 | Hiramatsu | ............ B60W 40/04 |
| | | | 382/104 |

FOREIGN PATENT DOCUMENTS

| | | |
|---|---|---|
| JP | H11-153406 A | 6/1999 |
| JP | 2017-211973 A | 11/2017 |
| JP | 2019-059430 A | 4/2019 |
| JP | 2021-165914 A | 10/2021 |

\* cited by examiner

*Primary Examiner* — James J Lee
*Assistant Examiner* — Jonathan E Reinert
(74) *Attorney, Agent, or Firm* — Oliff PLC

(57) ABSTRACT

A device for lane determination includes a processor configured to detect a vehicle region representing a target vehicle traveling in an area around a host vehicle from an image of the area around the host vehicle generated by a camera mounted on the host vehicle, and determine that the target vehicle is traveling on an adjacent lane next to a lane on which the host vehicle is traveling, in the case where the vehicle region touches a left or right edge of the image and where a bottom position of the vehicle region is within a predetermined vertical range of the image.

5 Claims, 5 Drawing Sheets

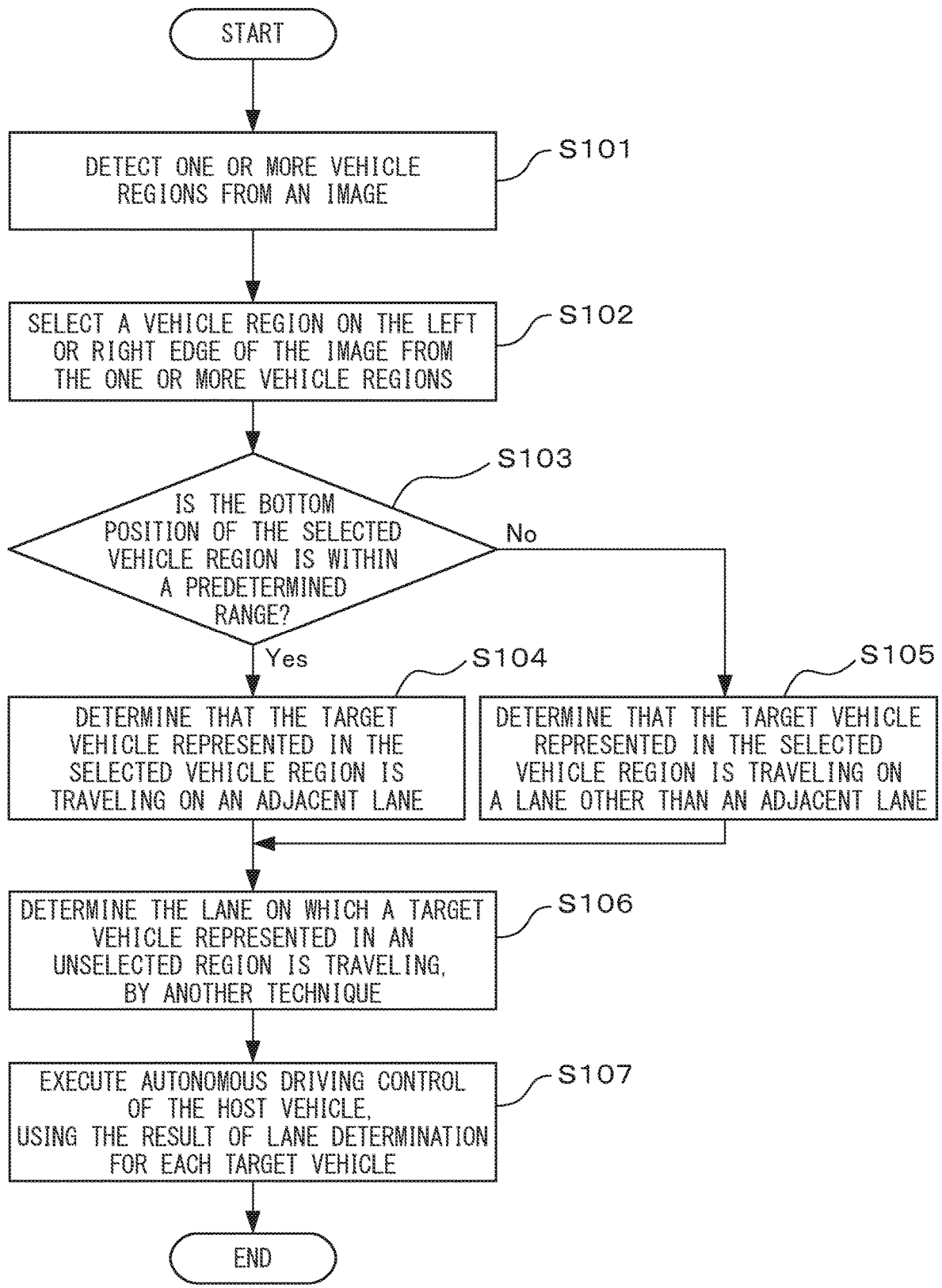

DEVICE, METHOD, AND COMPUTER PROGRAM FOR LANE DETERMINATION

FIELD

The present invention relates to a device, a method, and a computer program for determining a lane on which a vehicle in an area around a host vehicle is traveling.

BACKGROUND

To execute autonomous driving control of a vehicle or assist a driver in driving a vehicle, it is preferable that the positional relationship between the vehicle and another vehicle in an area therearound be able to be accurately detected. For this purpose, a technique to detect a lane on which a vehicle ahead is traveling has been proposed (see Japanese Unexamined Patent Publication JP11-153406A).

An obstacle detector for a vehicle disclosed in JP11-153406A detects a vehicle ahead from two images generated by a stereo camera and white lines from one of the two images, and determines a lane on which the vehicle ahead is traveling, based on the positional relationship between the region where the vehicle ahead is detected and the white lines.

SUMMARY

In the above-described technique, a lane on which a vehicle ahead is traveling is determined on the basis of the positional relationship with white lines on the road. However, it may be difficult to detect a lane-dividing line from an image generated by a vehicle-mounted camera, depending on the condition of the road surface or the situation around the vehicle. For example, it is difficult to detect a lane-dividing line when the lane-dividing line is indistinct in an image because of its blurriness or a wet road surface or when the lane-dividing line is covered by an object other than a vehicle of interest. It is therefore preferable that a lane on which a target vehicle in an area around a host vehicle is traveling be able to be determined, even if a lane-dividing line cannot be detected from an image.

It is an object of the present invention to provide a device that can determine a lane on which a target vehicle in an area around a host vehicle is traveling, even if it is difficult to detect a lane-dividing line from an image generated by a camera mounted on the host vehicle.

According to an embodiment, a device for lane determination is provided. The device includes a processor configured to: detect a vehicle region representing a target vehicle traveling in an area around a host vehicle from an image of the area around the host vehicle generated by a camera mounted on the host vehicle, and determine that the target vehicle is traveling on an adjacent lane next to a lane on which the host vehicle is traveling, in the case where the vehicle region touches a left or right edge of the image and where a bottom position of the vehicle region is within a predetermined range in a vertical direction of the image.

Regarding the device, the predetermined range is preferably a vertical range of the image where the adjacent lane is represented in the direction corresponding to a horizontal viewing angle of the camera.

The processor preferably makes the predetermined range wider as lane width of a road being traveled by the host vehicle is greater.

According to another embodiment, a method for lane determination is provided. The method includes detecting a vehicle region representing a target vehicle traveling in an area around a host vehicle from an image of the area around the host vehicle generated by a camera mounted on the host vehicle; and determining that the target vehicle is traveling on an adjacent lane next to a lane on which the host vehicle is traveling, in the case where the vehicle region touches a left or right edge of the image and where a bottom position of the vehicle region is within a predetermined vertical range of the image.

According to still another embodiment, a non-transitory recording medium that stores a computer program for lane determination is provided. The computer program includes instructions causing a processor mounted on a host vehicle to execute a process including: detecting a vehicle region representing a target vehicle traveling in an area around the host vehicle from an image of the area around the host vehicle generated by a camera mounted on the host vehicle; and determining that the target vehicle is traveling on an adjacent lane next to a lane on which the host vehicle is traveling, in the case where the vehicle region touches a left or right edge of the image and where a bottom position of the vehicle region is within a predetermined vertical range of the image.

The device for lane determination according to the present disclosure has an advantageous effect of being able to determine a lane on which a target vehicle in an area around a host vehicle is traveling, even if it is difficult to detect a lane-dividing line from an image generated by a camera mounted on the host vehicle.

BRIEF DESCRIPTION OF DRAWINGS

FIG. 5 is an operation flowchart of the vehicle control process including the lane determination process.

DESCRIPTION OF EMBODIMENTS

A device for lane determination, a method for lane determination executed by the device, and a computer program for lane determination will now be described with reference to the attached drawings. The device detects a region representing a target vehicle traveling in an area around a host vehicle from an image of the area around the host vehicle generated by an image capturing unit mounted on the host vehicle. The device determines that the target vehicle is traveling on a lane next to a host vehicle lane on which the host vehicle is traveling, in the case where the region representing the target vehicle touches a left or right edge of the image and where a bottom position of the region of the target vehicle is within a predetermined vertical range of the image. In the following, a region representing a target vehicle in an image will be referred to as a "vehicle region"; a lane next to a host vehicle lane, simply as an "adjacent lane"; and a vehicle equipped with the device for lane determination, as a "host vehicle."

The following describes an example in which the device for lane determination is applied to a vehicle control system. In this example, the device executes a lane determination process on an image obtained by a camera mounted on a host vehicle to detect a target vehicle traveling in an area around the host vehicle and to determine whether the target vehicle is traveling on an adjacent lane. The result of determination is used for driving control of the host vehicle.

Figure 1:
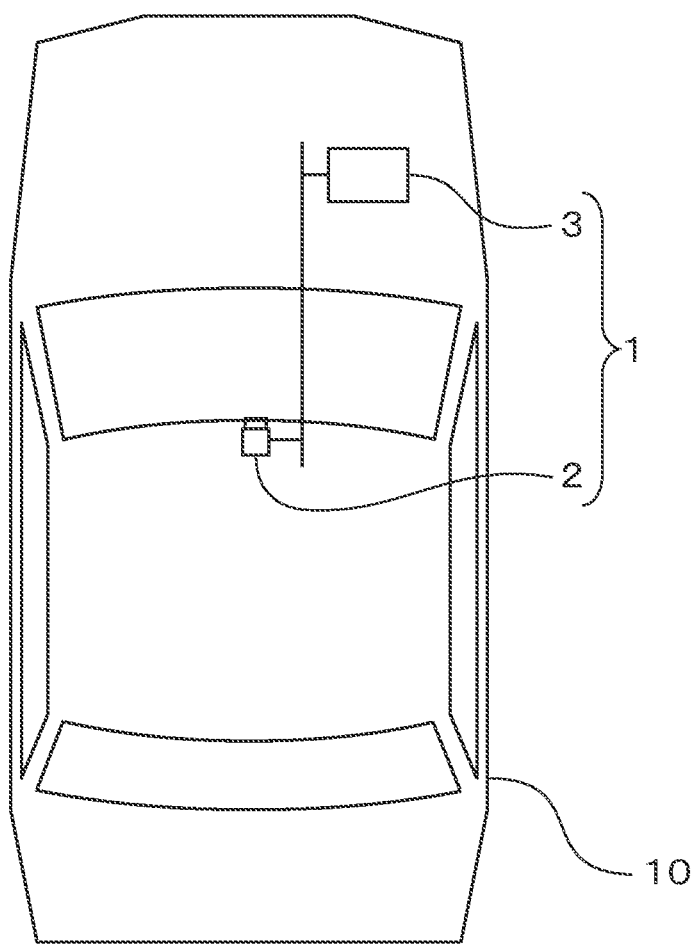
FIG. 1 schematically illustrates the configuration of a vehicle control system equipped with a device for lane determination.
Figure 2:
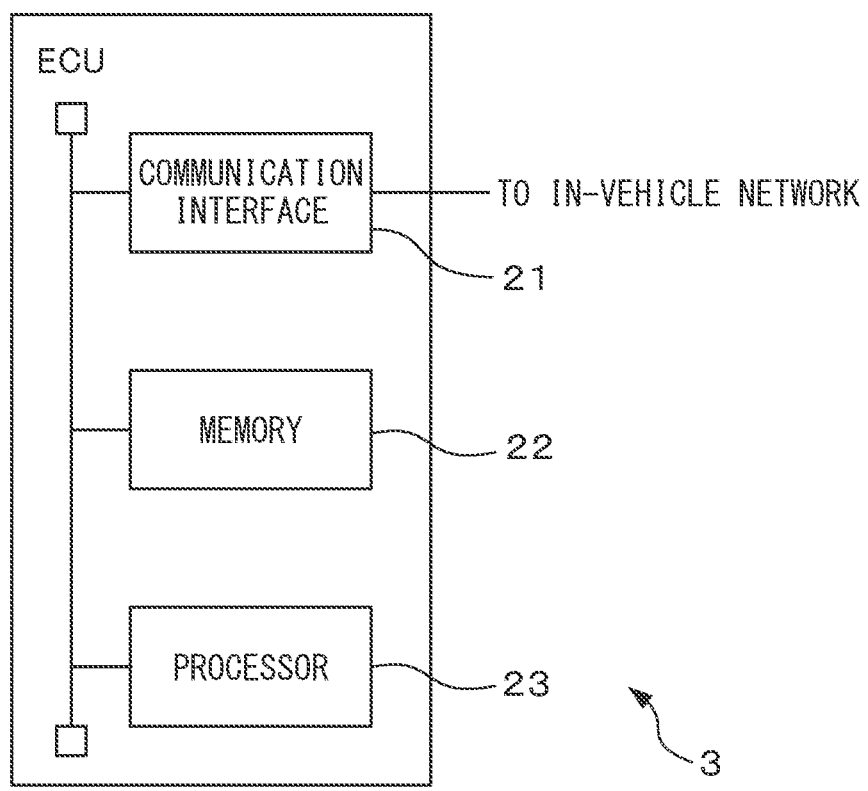
FIG. 2 illustrates the hardware configuration of an electronic control unit, which is an embodiment of the device for lane determination.

FIG. 1 schematically illustrates the configuration of a vehicle control system equipped with a device for lane determination. FIG. 2 illustrates the hardware configuration of an electronic control unit, which is an embodiment of the device for lane determination. In the present embodiment, the vehicle control system 1, which is mounted on a vehicle 10 (i.e., a host vehicle) and controls the vehicle 10, includes a camera 2 for taking pictures of the surroundings of the vehicle 10 and an electronic control unit (ECU) 3, which is an example of the device for lane determination. The camera 2 is communicably connected to the ECU 3 via an in-vehicle network conforming to a standard such as a controller area network. The vehicle control system 1 may further include a storage device (not illustrated) that stores a high-precision map representing information used for autonomous driving control, e.g., lane width, regulation speed, road markings such as lane-dividing lines, and the positions and types of traffic signs of each road section. The vehicle control system 1 may further include a range sensor (not illustrated), such as LiDAR or radar; a receiver (not illustrated) for determining the position of the vehicle 10 in conformity with a satellite positioning system, such as a GPS receiver; and a navigation device (not illustrated) for searching for a planned travel route of the vehicle 10.

The camera 2, which is an example of the image capturing unit, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented to the front of the vehicle 10. The camera 2 takes pictures of a region in front of the vehicle 10 every predetermined capturing period (e.g., 1/30 to 1/10 seconds), and generates images representing the region. Each image obtained by the camera 2 may be a color or grayscale image.

Every time an image is generated, the camera 2 outputs the generated image and the time of capturing (i.e., the time of generation of the image) to the ECU 3 via the in-vehicle network.

The ECU 3 controls the vehicle 10. In the present embodiment, the ECU 3 determines whether a target vehicle detected from time-series images obtained by the camera 2 is traveling on an adjacent lane, and controls the vehicle 10 to automatically drive it, based on the result of determination. To achieve this, the ECU 3 includes a communication interface 21, a memory 22, and a processor 23.

The communication interface 21, which is an example of a communication unit, includes an interface circuit for connecting the ECU 3 to the in-vehicle network. In other words, the communication interface 21 is connected to the camera 2 via the in-vehicle network. Every time an image is received from the camera 2, the communication interface 21 passes the received image to the processor 23.

The memory 22, which is an example of a storage unit, includes, for example, volatile and nonvolatile semiconductor memories. The memory 22 stores various types of data used in a lane determination process executed by the processor 23 of the ECU 3. As such data, the memory 22 stores, for example, parameters indicating information on the camera 2, such as the focal length, the orientation, and the height of the mounted position of the camera 2, and various parameters for specifying a classifier used in detection of a target vehicle. The memory 22 also stores various types of information used for determining a lane of a target vehicle. Such information includes a predetermined vertical range of an image to be compared with the bottom position of a vehicle region. Further, the memory 22 stores various types of data obtained or generated during the lane determination process, such as time-series images obtained in the most recent predetermined period and vehicle regions in the time-series images, for a certain period. Further, the memory 22 may store information used for travel control of the vehicle 10, such as a high-precision map.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit. During travel of the vehicle 10, the processor 23 executes a vehicle control process including the lane determination process on received images at predetermined intervals.

Figure 3:
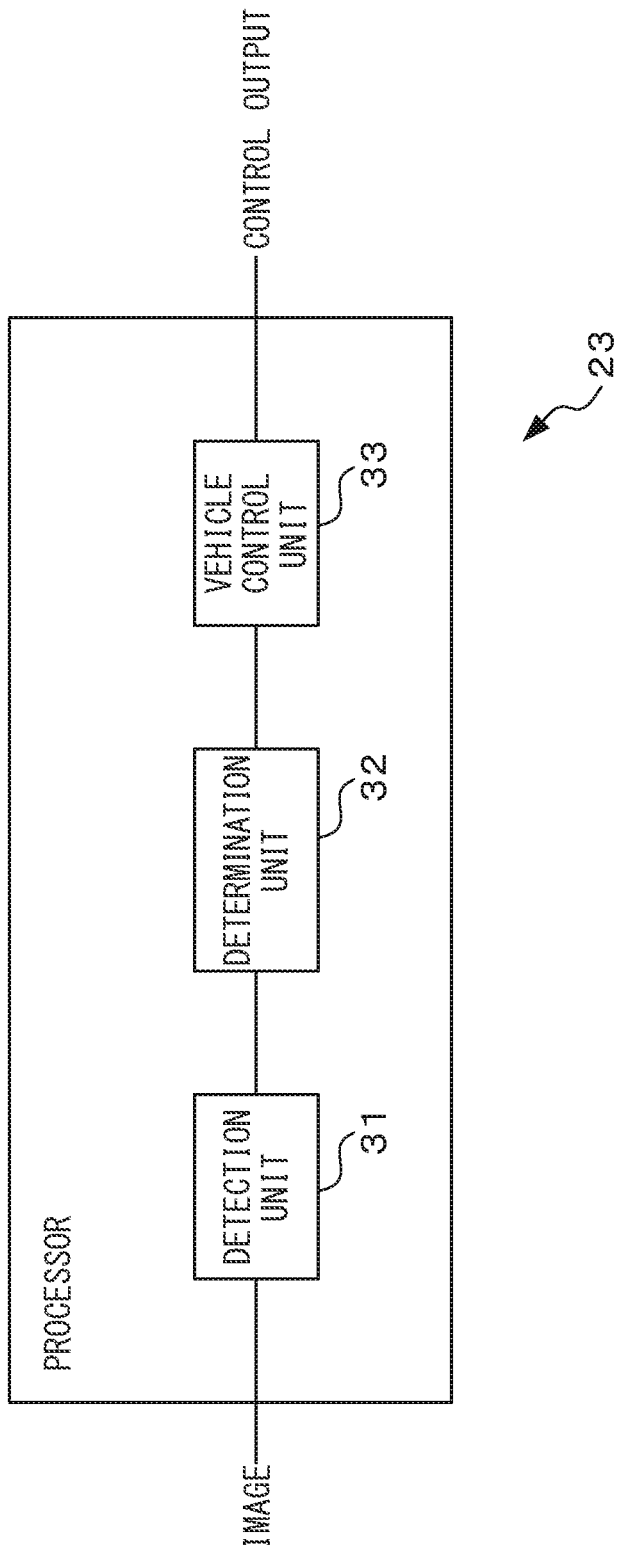
FIG. 3 is a functional block diagram of a processor of the electronic control unit, related to a vehicle control process including a lane determination process.

FIG. 3 is a functional block diagram of the processor 23 of the ECU 3, related to the vehicle control process including the lane determination process. The processor 23 includes a detection unit 31, a determination unit 32, and a vehicle control unit 33. These units included in the processor 23 are functional modules, for example, implemented by a computer program executed by the processor 23, or may be dedicated operating circuits provided in the processor 23. Of the units included in the processor 23, the detection unit 31 and the determination unit 32 execute the lane determination process. In the case where the vehicle 10 includes multiple cameras, the processor 23 may execute the lane determination process for each camera, based on images obtained by the camera.

The detection unit 31 inputs the latest received image into a classifier at predetermined intervals, and thereby detects a vehicle region representing a target vehicle in the image.

As such a classifier, the detection unit 31 can use a deep neural network (DNN) having architecture of a convolutional neural network (CNN) type, such as Single Shot MultiBox Detector (SSD) or Faster R-CNN. Alternatively, as such a classifier, the detection unit 31 may use a DNN having architecture of a self-attention network (SAN) type, such as Vision transformer, or a classifier based on another machine learning technique, such as an AdaBoost classifier. Such a classifier is trained in advance with a large number of training images representing vehicles in accordance with a predetermined training technique, such as backpropagation, so as to detect a target vehicle from an image.

The classifier may be trained in advance so as to further detect objects that affect travel of the vehicle 10, e.g., road markings, such as lane-dividing lines or stop lines, traffic signs, and pedestrians. In this case, the detection unit 31 can detect object regions representing these objects, as well as vehicle regions from an image by inputting the image into the classifier.

For each detected vehicle region, the detection unit 31 notifies the determination unit 32 and the vehicle control unit 33 of information indicating the position and area of the vehicle region in the image, and stores the information in the memory 22. When object regions representing road markings or other objects are detected, the detection unit 31 notifies, for each detected object region, the vehicle control unit 33 of information indicating the position and area of the object region in the image and the type of the object represented in the object region.

The determination unit 32 determines, for each detected vehicle region, whether the vehicle region touches the left or right edge of the image. When the bottom position of a vehicle region on the left or right edge of the image is within a predetermined vertical range of the image, the determination unit 32 determines that the target vehicle represented in the vehicle region is traveling on an adjacent lane. When the bottom position of a vehicle region is above the upper limit of the predetermined range, the determination unit 32 determines that the target vehicle represented in the vehicle region is traveling on a lane farther from the host vehicle lane than the adjacent lane. Conversely, when the bottom position of a vehicle region is below the lower limit of the predetermined range, the determination unit 32 does not determine the lane on which the target vehicle represented in the vehicle region is traveling, at this time. Alternatively, the determination unit 32 may determine the lane on which the target vehicle represented in the vehicle region is traveling, in accordance with another technique. The predetermined range is a vertical range of the image where the adjacent lane is represented in the direction corresponding to a horizontal viewing angle of the camera 2.

Pixels of an image correspond one-to-one to directions viewed from the camera 2 that generates the image. Thus, as long as a vehicle region touches the left or right edge of an image, the horizontal direction to a target vehicle viewed from the camera 2 is substantially fixed at the direction corresponding to the horizontal viewing angle of the camera 2. Further, the height of the mounted position and the orientation of the camera 2 are prestored in the memory 22 and known, as described above; and the bottom of a vehicle region is assumed to correspond to the position at which a target vehicle touches the road surface. Thus, the determination unit 32 can estimate the distance from the camera 2 to a target vehicle from the bottom position of a vehicle region in an image. More specifically, the target vehicle is nearer the vehicle 10 as the bottom position of the vehicle region is nearer the bottom of the image. In addition, the vehicle 10 usually travels along the center line of a host vehicle lane, and the distance from the vehicle 10 to an adjacent lane is not assumed to change greatly. For this reason, the determination unit 32 can determine whether a target vehicle is traveling on an adjacent lane, based on whether the bottom position of a vehicle region on the left or right edge of an image is within the predetermined range.

Figure 4:
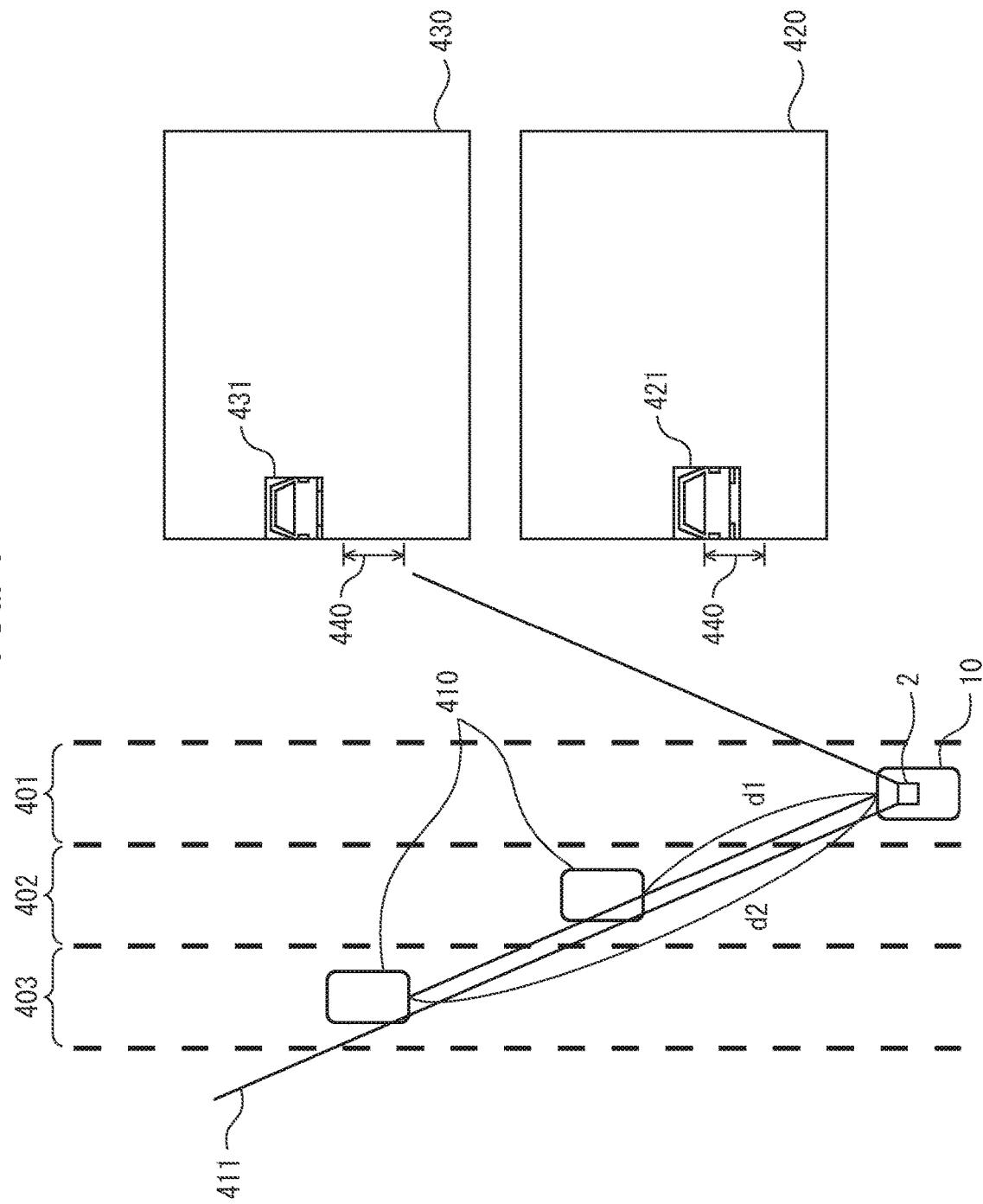
FIG. 4 illustrates an example of the relationship between the field of view of a vehicle-mounted camera, the position of a target vehicle, and a vehicle region in an image.

FIG. 4 illustrates an example of the relationship between the field of view of a vehicle-mounted camera, the position of a target vehicle, and a vehicle region in an image. FIG. 4 illustrates a case in which a target vehicle 410 is traveling on an adjacent lane 402 on the left of a host vehicle lane 401 on which the vehicle 10 is traveling, and a case in which a target vehicle 410 is traveling on a lane 403 on the immediate left of the adjacent lane 402. In addition, the target vehicles 410 in FIG. 4 are traveling at positions along the left edge 411 of the field of view of the camera 2 mounted on the vehicle 10. Hence, a vehicle region 421 in an image 420 generated by the camera 2 for the case where the target vehicle 410 is traveling on the adjacent lane 402 touches the left edge of the image 420. Similarly, a vehicle region 431 in an image 430 generated by the camera 2 for the case where the target vehicle 410 is traveling on the lane 403 also touches the left edge of the image 430. In addition, the direction to the target vehicle 410 viewed from the vehicle 10 is constant, regardless of the lane on which the target vehicle 410 is traveling, in the example illustrated in FIG. 4. Thus, the distance d1 from the vehicle 10 to the target vehicle 410 traveling on the adjacent lane 402 is shorter than the distance d2 from the vehicle 10 to the target vehicle 410 traveling on the lane 403. Therefore, the bottom position of the vehicle region 421 in the image 420 is lower than that of the vehicle region 431 in the image 430. In this way, the distance between the vehicle 10 and the target vehicle 410 varies, and thus the bottom position of the vehicle region in the image varies, depending on the lane on which the target vehicle 410 is traveling. The determination unit 32 can therefore determine whether the target vehicle 410 is traveling on the adjacent lane 402, based on whether the bottom position of the vehicle region is within a predetermined vertical range 440 of the image where the adjacent lane is represented in the direction corresponding to a horizontal viewing angle of the camera 2.

When a vehicle region does not touch the left or right edge of an image, the determination unit 32 may determine the lane on which the target vehicle represented in the vehicle region is traveling, in accordance with another technique. For example, when lane-dividing lines are detected from the image, the determination unit 32 may determine the lane on which the target vehicle represented in the vehicle region is traveling, based on the positional relationship between the vehicle region and the lane-dividing lines. As described above, the bottom position of a vehicle region in an image is assumed to correspond to the position at which the target vehicle represented in the vehicle region touches the road surface. Thus, the determination unit 32 estimates the distance from the vehicle 10 to the target vehicle, based on the bottom position of the vehicle region in the image and parameters of the camera 2, such as its orientation. In addition, the determination unit 32 estimates the lateral distance between the vehicle 10 and the target vehicle in a direction perpendicular to the lengthwise direction of the host vehicle lane, based on the estimate of the distance from the vehicle 10 to the target vehicle, the direction from the camera 2 corresponding to the center position of the vehicle region in the image, and the travel direction of the vehicle 10. The determination unit 32 may determine the lane on which the target vehicle is traveling, based on the lateral distance in units of lane width obtained by dividing the estimated lateral distance by the lane width at the current position of the vehicle 10. More specifically, when the lateral distance in units of lane width is less than one, the determination unit 32 determines that the target vehicle is traveling on the host vehicle lane; and when the lateral distance in units of lane width is not less than one and less than two, the determination unit 32 determines that the target vehicle is traveling on an adjacent lane. When the lateral distance in units of lane width is greater than two, the determination unit 32 can determine that the target vehicle is traveling on a lane farther from the host vehicle lane than the adjacent lane. The determination unit 32 uses the position indicated by the latest positioning information received by the ECU 3 from a GPS receiver (not illustrated) as the current position of the vehicle 10, and identifies the lane width at the current position of the vehicle 10 by referring to a high-precision map.

For each vehicle region, the determination unit 32 notifies the vehicle control unit 33 of the result of determination of the lane on which the target vehicle represented in the vehicle region is traveling.

The vehicle control unit 33 executes autonomous driving control of the vehicle 10, using the result of determination of the lanes on which individual target vehicles around the vehicle 10 are traveling.

For example, when a target vehicle is traveling on the host vehicle lane ahead of the vehicle 10, the vehicle control unit 33 controls the speed of the vehicle 10 so as to keep the distance between the vehicle 10 and the target vehicle above a predetermined distance. The vehicle control unit 33 estimates the distance between the vehicle 10 and the target vehicle traveling on the host vehicle lane, based on the bottom position of the vehicle region representing the target vehicle, as described in relation to the determination unit 32. Alternatively, in the case where the vehicle 10 is equipped with a range sensor (not illustrated), the vehicle control unit 33 may use the distance measured by the range sensor in the direction corresponding to the center of the vehicle region representing the target vehicle traveling on the host vehicle lane as the distance between the vehicle 10 and the target vehicle.

The vehicle control unit 33 may identify a destination lane leading toward a destination indicated by a planned travel route received by the ECU 3 from a navigation device (not illustrated). When the destination lane is a lane next to the host vehicle lane, the vehicle control unit 33 moves the vehicle 10 to the adjacent lane. To this end, when it is determined by the determination unit 32 that a target vehicle is traveling on the adjacent lane to which a lane change will be made, the vehicle control unit 33 sets a planned trajectory of the vehicle 10 so as to keep the distance between the target vehicle and the vehicle 10 above a predetermined distance, and controls components of the vehicle 10 so that the vehicle 10 travels along the planned trajectory. The vehicle control unit 33 identifies the host vehicle lane on which the vehicle 10 is traveling, based on a high-precision map and an image generated by the camera 2. For example, assuming the position and travel direction of the vehicle 10, the vehicle control unit 33 projects features such as road markings detected from an image by the detection unit 31 onto a high-precision map to determine the degree of matching between the detected features and corresponding features represented in the high-precision map. The vehicle control unit 33 identifies the position and travel direction of the vehicle 10 that maximize the degree of matching, by repeating the above-described process while variously changing the assumed position and travel direction of the vehicle 10. The vehicle control unit 33 then estimates the actual position and travel direction of the vehicle 10 to be the assumed position and travel direction of the vehicle 10 for the case where the degree of matching is a maximum. In addition, the vehicle control unit 33 refers to the high-precision map to identify the lane including the estimated position of the vehicle 10 as the host vehicle lane.

Alternatively, when it is determined by the determination unit 32 that a target vehicle is traveling on an adjacent lane to which a lane change will be made, the vehicle control unit 33 may predict whether the target vehicle will make a lane change to the host vehicle lane. In this case, the vehicle control unit 33 applies a predetermined tracking technique, such as the KLT method, to time-series images generated by the camera 2 in the most recent predetermined period to track the target vehicle traveling on the adjacent lane. More specifically, the vehicle control unit 33 associates vehicle regions representing the same target vehicle in the time-series images with each other, and inputs the vehicle regions representing the same target vehicle in the time-series images in chronological order into a classifier that has been trained to identify the state of lighting of direction indicators, thereby identifying the state of lighting of the direction indicators of the target vehicle. When the direction indicators of the target vehicle is in a state where the indicator on the side of the host vehicle lane is blinking, the vehicle control unit 33 predicts that the target vehicle will make a lane change to the host vehicle lane. As such a classifier, the vehicle control unit 33 can use, for example, a recurrent neural network. When a target vehicle traveling on an adjacent lane is predicted to make a lane change to the host vehicle lane, the vehicle control unit 33 controls components of the vehicle 10 so as to keep the distance between the vehicle 10 and the target vehicle above a predetermined distance.

In addition, when an obstacle such as a pedestrian is detected from an image, the vehicle control unit 33 controls components of the vehicle 10 so that the vehicle 10 will not collide with the obstacle.

FIG. 5 is an operation flowchart of the vehicle control process including the lane determination process. The processor 23 executes the vehicle control process in accordance with the operation flowchart described below at predetermined intervals. In the operation flowchart below, the processing of steps S101 to S105 corresponds to the lane determination process according to the present embodiment.

The detection unit 31 of the processor 23 detects one or more vehicle regions from the latest image generated by the camera 2 (step S101). The determination unit 32 of the processor 23 selects a vehicle region on the left or right edge of the image from the vehicle regions (step S102), and determines whether the bottom position of the selected vehicle region in the image is within a predetermined vertical range of the image (step S103). When the bottom position is within the predetermined range (Yes in step S103), the determination unit 32 determines that the target vehicle represented in the vehicle region is traveling on an adjacent lane (step S104).

When the bottom position is outside the predetermined range (No in step S103), the determination unit 32 determines that the target vehicle represented in the vehicle region is traveling on a lane other than an adjacent lane (step S105). When multiple vehicle regions are selected, the determination unit 32 executes the processing of steps S103 to S105 on each of the selected vehicle regions.

Regarding a target vehicle represented in an unselected vehicle region, the determination unit 32 determines the lane on which the target vehicle is traveling, in accordance with another technique (step S106).

After steps S104 to S106, the vehicle control unit 33 of the processor 23 executes autonomous driving control of the vehicle 10, using the result of determination of the lanes on which individual target vehicles around the vehicle 10 are traveling (step S107). The processor 23 then terminates the vehicle control process.

As has been described above, the device for lane determination detects a region of a target vehicle from an image representing an area around a host vehicle. The device determines that the target vehicle is traveling on a lane next to a host vehicle lane on which the host vehicle is traveling, in the case where the vehicle region touches a left or right edge of the image and where a bottom position of the vehicle region is within a predetermined vertical range of the image. In this way, the device can determine whether a target vehicle is traveling on an adjacent lane, without detecting a lane-dividing line. The device can therefore determine a lane on which a target vehicle in an area around a host vehicle is traveling, even if it is difficult to detect a lane-dividing line from an image generated by an image capturing unit mounted on the host vehicle.

According to a modified example, the camera 2 may be mounted so as to be oriented to the rear of the vehicle 10. In this case also, the device for lane determination can determine whether a target vehicle is traveling on an adjacent lane, based on an image generated by the camera 2, as in the embodiment.

The predetermined vertical range of the image may be adjusted, depending on the lane width of a road being traveled by the vehicle 10. In this case, the determination unit 32 identifies the lane width by referring to the current position of the vehicle 10 indicated by the latest positioning information generated by a GPS receiver and a high-precision map, as described above. The determination unit 32 makes the predetermined range wider as the identified lane width is greater. In addition, the determination unit 32 may raise the lower limit position of the predetermined range as the identified lane width is greater, because the distance from the vehicle 10 to an adjacent lane is assumed to increase as the identified lane width is greater. In this way, the determination unit 32 can determine more accurately as to whether a target vehicle is traveling on an adjacent lane, by adjusting the predetermined range, depending on the lane width.

The computer program for achieving the functions of the units of the processor 23 of the device for lane determination according to the embodiment or modified example may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A device for lane determination comprising:
   a communication interface configured to communicate with a camera mounted on a host vehicle; and
   a processor operatively connected to the communication interface, the processor being programmed to:
   access, via the communication interface, an image of an area around the host vehicle generated by the camera;
   detect a target vehicle region within the image by:
      inputting the accessed image into a machine learning classifier, the classifier having been trained to identify a region of an image containing a vehicle by having been trained with a training data set including training images containing vehicles; and
      receiving output from the classifier indicating a location and area of a target vehicle region within the accessed image;
   determine whether a target vehicle is traveling on a traveling lane that is adjacent to a travel lane on which the host vehicle is traveling without having to detect a lane dividing line in the accessed image by:
      based on the location and area of the target vehicle region, determining whether the target vehicle region touches a left or right edge of the accessed image;
      in response to a determination that the target vehicle region touches a left or right edge of the accessed image, determining whether a bottom position of the target vehicle region is within a predetermined vertical range of the accessed image; and
      in response to a determination that the bottom position of the target vehicle region is within the predetermined vertical range of the accessed image, determining that the target vehicle represented in the target vehicle region is traveling on the travel lane that is adjacent to the travel lane in which the host vehicle is traveling; and
   based on the determination that the target vehicle is traveling on the travel lane that is adjacent to the travel lane in which the host vehicle is traveling, execute autonomous driving control of the host vehicle to maintain a distance between the target vehicle and the host vehicle.

2. The device according to claim 1, wherein the predetermined range is a vertical range of the image where the adjacent lane is represented in a direction corresponding to a horizontal viewing angle of the camera.

3. The device according to claim 1, wherein the processor is programmed to make the predetermined range wider as lane width of a road being traveled by the host vehicle is greater.

4. A method for lane determination comprising:
   accessing, with a processor via a communication interface, an image of an area around a host vehicle generated by a camera mounted on the host vehicle;
   detecting, with the processor, a target vehicle region within the image by:
      inputting the accessed image into a machine learning classifier, the classifier having been trained to identify a region of an image containing a vehicle by having been trained with a training data set including training images containing vehicles; and
      receiving output from the classifier indicating a location and area of a target vehicle region within the accessed image;
   determining, with the processor, whether a target vehicle is traveling on a traveling lane that is adjacent to a travel lane on which the host vehicle is traveling without having to detect a lane dividing line in the accessed image by:
      based on the location and area of the target vehicle region, determining whether the target vehicle region touches a left or right edge of the accessed image;
      in response to a determination that the target vehicle region touches a left or right edge of the accessed image, determining whether a bottom position of the target vehicle region is within a predetermined vertical range of the accessed image; and
      in response to a determination that the bottom position of the target vehicle region is within the predetermined vertical range of the accessed image, determining that the target vehicle represented in the target vehicle region is traveling on the travel lane that is adjacent to the travel lane in which the host vehicle is traveling; and
   based on the determination that the target vehicle is traveling on the travel lane that is adjacent to the travel lane in which the host vehicle is traveling, execute autonomous driving control of the host vehicle to maintain a distance between the target vehicle and the host vehicle.

5. A non-transitory recording medium that stores a computer program for lane determination, the computer program causing a processor mounted on a host vehicle to execute a process comprising:
   accessing via a communication interface, an image of an area around a host vehicle generated by a camera mounted on a host vehicle;
   detecting a target vehicle region within the image by:
      inputting the accessed image into a machine learning classifier, the classifier having been trained to identify a region of an image containing a vehicle by having been trained with a training data set including training images containing vehicles; and receiving output from the classifier indicating a location and area of a target vehicle region within the accessed image;

determining whether a target vehicle is traveling on a traveling lane that is adjacent to a travel lane on which the host vehicle is traveling without having to detect a lane dividing line in the accessed image by:

based on the location and area of the target vehicle region, determining whether the target vehicle region touches a left or right edge of the accessed image;

in response to a determination that the target vehicle region touches a left or right edge of the accessed image, determining whether a bottom position of the target vehicle region is within a predetermined vertical range of the accessed image; and in response to a determination that the bottom position of the target vehicle region is within the predetermined vertical range of the accessed image, determining that the target vehicle represented in the target vehicle region is traveling on the travel lane that is adjacent to the travel lane in which the host vehicle is traveling; and based on the determination that the target vehicle is traveling on the travel lane that is adjacent to the travel lane in which the host vehicle is traveling, execute autonomous driving control of the host vehicle to maintain a distance between the target vehicle and the host vehicle.

* * * * *